(12) United States Patent
Bullock et al.

(10) Patent No.: US 10,611,478 B2
(45) Date of Patent: Apr. 7, 2020

(54) STRUCTURAL PANELS FOR EXPOSED SURFACES

(71) Applicant: Lockheed Martin Corporation, Bethesda, MD (US)

(72) Inventors: Steven Edward Bullock, Canton, GA (US); Vernecia Sharaé Meredith, Marietta, GA (US); Charles J. Novak, Marietta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 304 days.

(21) Appl. No.: 15/495,353

(22) Filed: Apr. 24, 2017

(65) Prior Publication Data

US 2018/0305020 A1 Oct. 25, 2018

(51) Int. Cl.
| | | |
|---|---|---|
| *B64D 7/00* | (2006.01) | |
| *B32B 5/18* | (2006.01) | |
| *B32B 37/14* | (2006.01) | |
| *B64C 1/12* | (2006.01) | |
| *B64C 1/40* | (2006.01) | |
| *B64C 3/26* | (2006.01) | |
| *B64C 5/02* | (2006.01) | |
| *B64C 5/06* | (2006.01) | |
| *B32B 5/00* | (2006.01) | |
| *B64C 1/00* | (2006.01) | |

(52) U.S. Cl.
CPC ............... *B64D 7/00* (2013.01); *B32B 5/00* (2013.01); *B32B 5/18* (2013.01); *B32B 37/14* (2013.01); *B64C 1/12* (2013.01); *B64C 1/40* (2013.01); *B64C 3/26* (2013.01); *B64C 5/02* (2013.01); *B64C 5/06* (2013.01); *B32B 2266/04* (2013.01); *B32B 2605/12* (2013.01); *B32B 2605/18* (2013.01); *B64C 2001/0054* (2013.01)

(58) Field of Classification Search
None
See application file for complete search history.

(56) References Cited

U.S. PATENT DOCUMENTS

| | | | | |
|---|---|---|---|---|
| 3,846,203 A | * | 11/1974 | Immethun | E04C 2/284 |
| | | | | 156/265 |
| 6,698,331 B1 | | 2/2004 | Yu et al. | |
| 2002/0084382 A1 | | 7/2002 | Crist | |

(Continued)

FOREIGN PATENT DOCUMENTS

| | | |
|---|---|---|
| DE | 10 2009 032 497 A1 | 1/2011 |
| EP | 2 431 175 A1 | 3/2012 |
| FR | 2 815 603 A1 | 4/2002 |

OTHER PUBLICATIONS

Extended European Search Report for Application No./Patent No. 18168930.8-1010—dated Oct. 1, 2018.

(Continued)

*Primary Examiner* — Chinessa T. Golden
(74) *Attorney, Agent, or Firm* — Baker Botts L.L.P.

(57) ABSTRACT

An apparatus includes a foam layer, a coating layer and an elastomer. The foam layer includes a first surface for coupling the apparatus to a surface exposed to weather, a second surface opposite the first surface, and a plurality of pores within the foam layer. The coating layer is deposited on the second surface of the foam layer. The elastomer is deposited within the plurality of pores within the foam layer.

20 Claims, 3 Drawing Sheets

(56) References Cited

U.S. PATENT DOCUMENTS

| | | | |
|---|---|---|---|
| 2003/0057017 A1* | 3/2003 | Dussac | B64C 1/40 |
| | | | 181/290 |
| 2005/0067072 A1* | 3/2005 | Vavrick | C06B 27/00 |
| | | | 149/37 |
| 2009/0181237 A1* | 7/2009 | Kaiser | C09D 7/67 |
| | | | 428/323 |
| 2011/0318564 A1 | 12/2011 | Qin et al. | |
| 2014/0311383 A1* | 10/2014 | Asaimuthu | C08K 3/36 |
| | | | 106/286.2 |
| 2016/0265231 A1 | 9/2016 | Stache et al. | |

OTHER PUBLICATIONS

Nonlinear Properties of Metallic Cellular Materials With a Negative Poisson's Ration, Lakes, 1; Choi, J.B. and Lakes, R.S.; adapted from J. Materials Science, 27, 5373-5381—1992.

Negative Poisson's Ratio Polymeric and Metallic Foams; Friis/Lakes/Park, 1; adapted from Friis, E.A., Lakes, R.S., and Park, J.B., "Negative Poisson's ratio polymeric and metallic materials", Journal of Materials Science, 23, 4406-4414—1988.

Cold Regions Science and Technology; Investigation of ice shedding properties of superhydrophobic coatings on helicopter blades by Stefania Tarquini et al.—2014; pp. 50-58.

Aluminum Foam Integral Armor: A New Dimension in Armor Design by Bazle A. Gama et al.;—2001; pp. 382-395.

\* cited by examiner

STRUCTURAL PANELS FOR EXPOSED SURFACES

TECHNICAL FIELD

This disclosure relates in general to structural panels, and more particularly to structural panels for exposed surfaces.

BACKGROUND

Aircraft are subject to a number of environmental conditions, such as ice buildup and external noise, that may be detrimental to the aircraft, cargo, and passengers. Ice buildup on aircraft wings is a well-known problem that plagues both the military and civilian aerospace industry. When the ice reaches a critical mass that exceeds the adhesion strengths of the sheets, it releases with little warning and may impact the side of the fuselage and cause damage.

SUMMARY OF THE DISCLOSURE

According to one embodiment, an apparatus includes a foam layer, a coating layer and an elastomer. The foam layer includes a first surface for coupling the apparatus to a surface exposed to weather, a second surface opposite the first surface, and a plurality of pores within the foam layer. The coating layer is deposited on the second surface of the foam layer. The elastomer is deposited within the plurality of pores within the foam layer.

According to another embodiment, a method includes depositing an elastomer within a plurality of pores of a foam panel. The foam panel includes a first surface for coupling the foam panel to a surface exposed to weather, a second surface opposite the first surface, and a plurality of pores within the foam layer. The method further includes coating the second surface of the foam panel with a coating layer. The method also includes coupling the foam panel to the surface exposed to weather.

According to yet another embodiment, a method includes determining a target acoustic profile based on acoustic conditions at an exterior surface exposed to weather. The method further includes determining a plurality of foam layer characteristics based on the target acoustic profile. The method further includes determining one or more of elastomer characteristics based on the target acoustic profile and the plurality of foam layer characteristics. The method further includes providing a foam layer comprising the plurality of foam layer characteristics. The method further includes depositing an elastomer into the provided foam layer according to the one or more elastomer characteristics. The method further includes coupling the foam layer comprising the deposited elastomer onto the exterior surface exposed to weather. The foam layer including the deposited elastomer absorbs acoustic energy corresponding to the target acoustic profile.

The present disclosure may provide numerous advantages. For example, the foam layer combined with the elastomer may be sufficiently strong and elastic to absorb impacts from objects, thereby protecting the surface on which the apparatus is coupled. Absorption of mechanical energy may be tailored based on the materials used in the foam panel and/or the elastomer deposited within the foam panel. As another example, the foam panel may comprise a metallic foam having a neutral or negative Poisson's ratio. Having a neutral or negative Poisson's ratio may enhance adhesion of the foam panel and certain absorption properties. Another advantage of the present disclosure is that the coating layer in combination with the foam layer may be hydrophobic. The hydrophobic nature of the apparatus may prevent the buildup of ice on the surface of the apparatus and thereby, the surface exposed to weather. As yet another example, the apparatus may exhibit nonlinear mechanical absorption capabilities, which may serve as a shrapnel barrier or low-grade ballistics armor. Certain other advantages may be realized with the use of fluorinated elastomer material deposited within the foam layer. For example, fluorinated elastomers may be more resistant to degradation and other environmental forces.

Other aspects disclosed herein provide other advantages. For example, using a target acoustic profile, a foam layer with a deposited elastomer may be produced to absorb acoustic energy based on the target acoustic profile. Selective acoustic energy absorption may enhance the safety and comfort of passengers in vehicles such as an aircraft. As another example, certain foam layer and elastomer characteristics may be determined based on the acoustic profile. By choosing the set of characteristics that provide the panel with acoustic absorption most closely matching the acoustic profile, the foam layer with deposited elastomer may be optimized for particular exterior surfaces and conditions. As yet another example, an additional foam layer may be added to the foam layer with deposited elastomer to improve the absorption characteristics in the created panel. The additional foam layer may be disposed between the exterior surface and the foam layer, protecting the additional foam layer from environmental conditions.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5, where like numbers are used to indicate like and corresponding parts.

Ice may build up on the wings or other parts of an aircraft during operation. If allowed to build up, the ice on the aircraft may reach a critical mass such that the weight of the sheet of ice exceeds the adhesion strength of the ice. The ice sheets may then release from the aircraft and impact a portion of the aircraft, such as the fuselage, potentially causing damage.

The amount of ice allowed to build up on parts of an aircraft may be limited by embedded heaters. Heated laminate or wires embedded into a coating may supply heat to melt the ice, preventing its buildup. The wires and heaters, however, require maintenance, and often cause coating failures due to the highly localized temperatures at the surface of the aircraft.

External noise reduction on aircraft, targeting low frequencies, may be achieved by using high volume polyurethane foam. This foam, however, easily degrades during regular operation of the aircraft. The foam has to be replaced regularly, increasing material and maintenance costs.

To address these and other problems, embodiments of the disclosure provide structural panels that may be adhered to exposed surfaces such as the exterior of an aircraft. Certain structural panels adhered to portions of an aircraft may allow the aircraft to avoid damage from impinging ice and may reduce acoustic energy. For example, a foam panel may include a super hydrophobic coating layer and elastomer deposited within the foam. A low-density, high-strength foam may enable the panels to absorb mechanical energy from ice impact. A coating layer may prevent ice buildup and serve as a UV tolerant rain erosion topcoat. The deposited elastomers may mechanically reinforce the foam and provide acoustic dampening properties.

Additionally, foam panels may be created with selective acoustic reduction properties. For example, foam panels may be constructed to absorb particular frequencies at certain levels of absorption. A target acoustic profile may first be determined based on the surrounding environment of the target surface. Using the target acoustic profile, the foam panel may be constructed by first determining foam layer characteristics and elastomer characteristics that will enhance the absorption of the targeted acoustic energy. Additional foam layers may be added to change the absorption characteristics of the foam panel to better absorb acoustic energy based on the acoustic profile. By creating acoustic energy selective foam panels, the harmful or undesirable acoustic energy may be reduced more effectively. When attached to the exterior of an aircraft, such panels may reduce the amount of noise inside the fuselage, thereby increasing the comfort and safety of any passengers.

Accordingly, aspects of the present disclosure include an apparatus that, in one embodiment, includes a foam layer, a coating layer and an elastomer. The foam layer includes a first surface for coupling the apparatus to a surface exposed to weather, a second surface opposite the first surface, and a plurality of pores within the foam layer. The coating layer is deposited on the second surface of the foam layer. The elastomer is deposited within the plurality of pores within the foam layer.

In additional aspects, the present disclosure includes a method that, in one embodiment, includes determining a target acoustic profile based on acoustic conditions at an exterior surface exposed to weather. The method further includes determining a plurality of foam layer characteristics based on the target acoustic profile. The method further includes determining one or more elastomer characteristics based on the target acoustic profile and the plurality of foam layer characteristics. The method further includes providing a foam layer comprising the one or more foam layer characteristics. The method further includes depositing an elastomer into the provided foam layer according to the one or more elastomer characteristics. The method further includes coupling the foam layer comprising the deposited elastomer onto the exterior surface exposed to weather. The foam layer including the deposited elastomer absorbs acoustic energy corresponding to the target acoustic profile.

The present disclosure may provide numerous advantages. For example, the foam layer combined with the elastomer may be sufficiently strong and elastic to absorb impacts from objects such as ice, thereby protecting the surface on which the apparatus is coupled. Absorption of mechanical energy may be tailored based on the materials used in the foam panel and/or the elastomer deposited within the foam panel. As another example, the foam panel may comprise a metallic foam having a neutral or negative Poisson's ratio. Having a neutral or negative Poisson's ratio may enhance adhesion of the foam panel and certain absorption properties. Another advantage of the present disclosure is that the coating layer in combination with the foam layer may be hydrophobic. The hydrophobic nature of the apparatus may prevent the buildup of ice on the surface of the apparatus and thereby, the surface exposed to weather. As yet another example, the apparatus may exhibit nonlinear mechanical absorption capabilities, which may serve as a shrapnel barrier or low-grade ballistics armor. Certain other advantages may be realized with the use of fluorinated elastomer material deposited within the foam layer. For example, fluorinated elastomers may be more resistant to degradation and other environmental forces.

Other aspects disclosed herein provide other advantages. For example, using a target acoustic profile, a foam layer with a deposited elastomer may be produced to absorb acoustic energy based on the target acoustic profile. Selective acoustic energy absorption may enhance the safety and comfort of passengers in vehicles, such as an aircraft. As another example, certain foam layer and elastomer characteristics may be determined based on the acoustic profile. By choosing the set of characteristics that provide the panel with acoustic absorption most closely matching the acoustic profile, the foam layer with deposited elastomer may be optimized for particular exterior surfaces and conditions. As yet another example, an additional foam layer may be added to the foam layer with deposited elastomer to improve the absorption characteristics in the created panel. The additional foam layer may be disposed between the exterior surface and the foam layer, protecting the additional foam layer from the environmental conditions.

Other technical advantages will be readily apparent to one skilled in the art from the following figures, descriptions, and claims. Moreover, while specific advantages have been enumerated above, various embodiments may include all, some, or none of the enumerated advantages.

Figure 1:
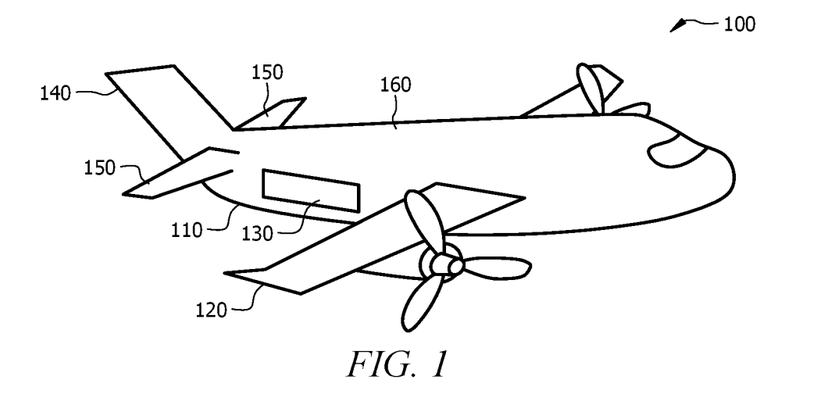
FIG. 1 is a diagram illustrating an example aircraft on which a one or more panels may be coupled to an exterior surface, according to certain embodiments.
Figure 2:
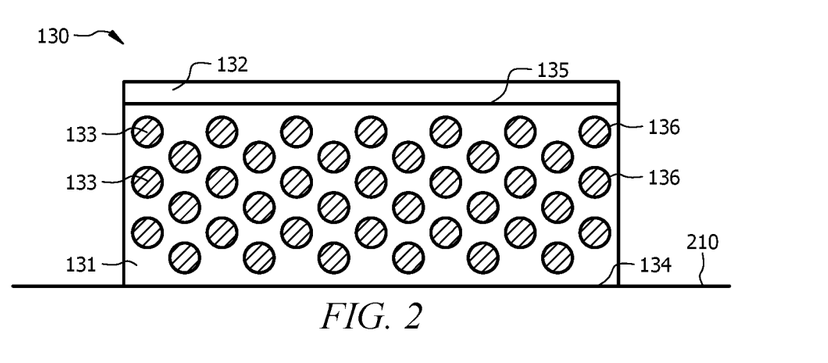
FIG. 2 is a cross-sectional view illustrating an example of the panel of FIG. 1, according to certain embodiments.
Figure 3:
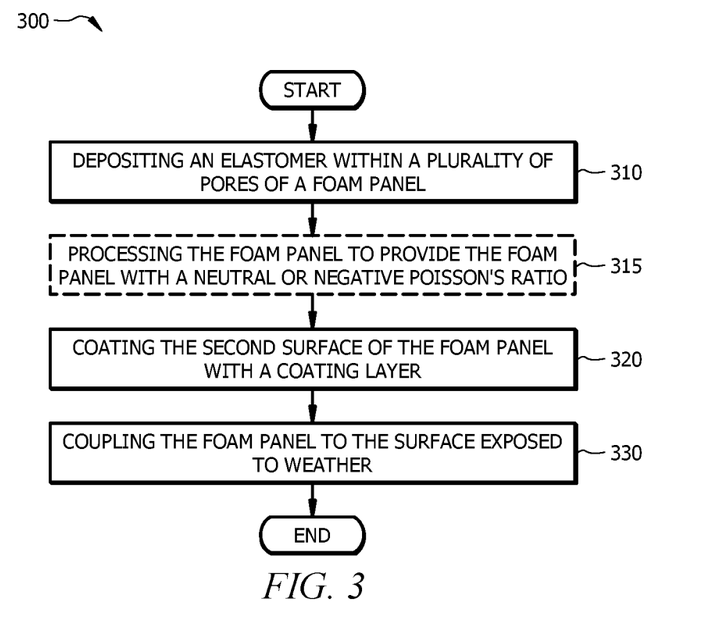
FIG. 3 is a flow chart diagram illustrating an example method of coupling a panel to a surface exposed to weather, according to certain embodiments.
Figure 4:
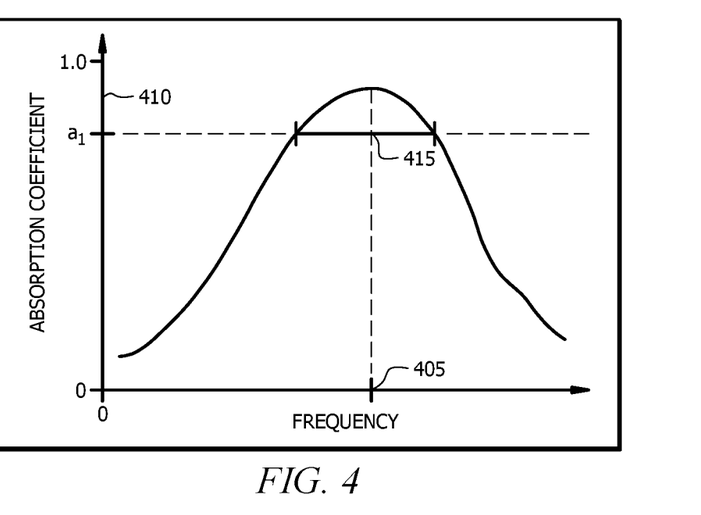
FIG. 4 is an example absorption plot of acoustic energy over a frequency range.
Figure 5:
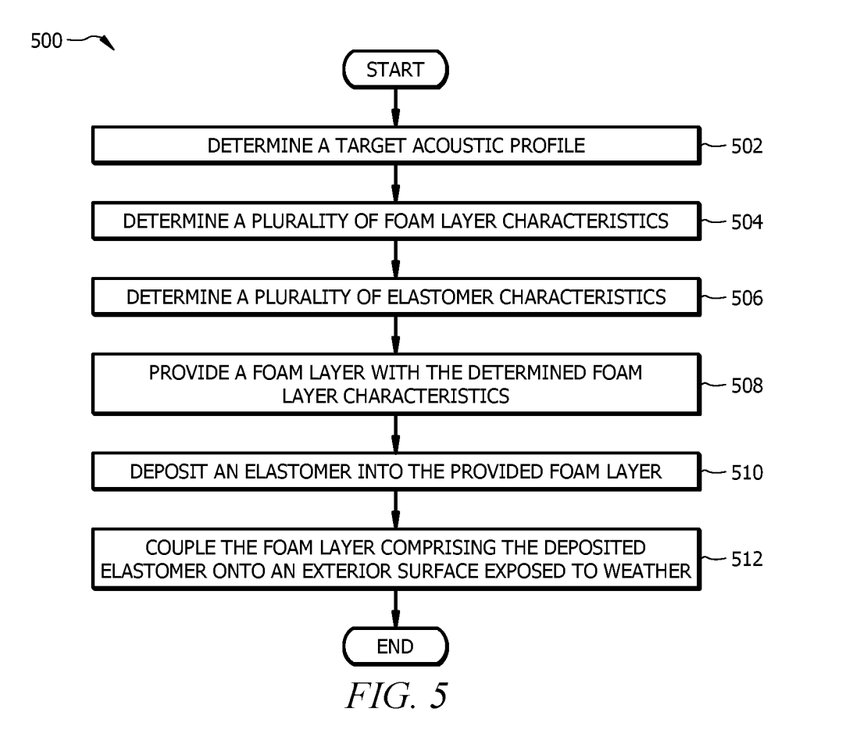
FIG. 5 is a flow chart diagram illustrating an example method of providing a panel with selective acoustic energy absorption characteristics, according to certain embodiments.

Additional details are discussed in FIGS. 1 through 5. FIG. 1 illustrates an example aircraft on which one or more panels may be coupled, and FIG. 2 shows a cross-sectional view of an example of the panel of FIG. 1. FIG. 3 illustrates an example method of coupling a panel to an exposed surface. FIG. 4 illustrates an example absorption plot of the absorption coefficient plotted over a range of frequencies. FIG. 5 is a flow chart diagram illustrating an example method of providing a panel with selective acoustic energy absorption characteristics.

FIG. 1 is a diagram illustrating an example aircraft on which one or more panels may be coupled to an exterior surface, according to certain embodiments. Aircraft 100 may be any type of airborne vehicle in an embodiment. Aircraft 100 may include a fuselage 110, wings 120, and one or more panels 130 coupled to aircraft 100 in certain embodiments.

In particular embodiments, aircraft 100 may include a vertical stabilizer 140 and horizontal stabilizers 150. In other embodiments, aircraft 100 may be a tailless aircraft. In some embodiments, aircraft 100 may be a manned aircraft and may include one or more passengers. In other embodiments, aircraft 100 may be an unmanned aerial vehicle (UAV).

Fuselage 110 may be a structural component of aircraft 100 in an embodiment. Fuselage 110 may be any shape. Fuselage 110 may be configured to hold crew, passengers, or cargo, in some embodiments. Fuselage 110 may be coupled to wings 120 in certain embodiments. In some embodiments, fuselage 110 is also coupled to one or more of vertical stabilizer 140 and horizontal stabilizers 150.

Aircraft 100 may have an exterior surface 160 exposed to weather. Exterior surface 160 may be subject to wind, rain, snow, ice, noise or other environmental conditions during operation, including while the aircraft 100 is airborne. Exterior surface 160 may extend to the surface of one or more of fuselage 110, wings 120, vertical stabilizer 140, and horizontal stabilizers 150.

One or more panels 130 may be coupled to any suitable portion of exterior surface 160 of aircraft 100. For example, panels 130 may be coupled to one or more of fuselage 110, wings 120, vertical stabilizer 140, and horizontal stabilizers 150. In some embodiments, multiple panels 130 may be coupled to a particular portion of aircraft 100. For example, two panels 130 may be coupled to exterior surface 160 of aircraft 100 at fuselage 110.

In some embodiments, panels 130 may protect aircraft 100 from released ice or other projectiles. For example, ice may form on wings 120 of aircraft 100 during flight. After reaching a critical mass, the ice may release from wings 120 and impinge aircraft 100 at fuselage 110, wings 120, vertical stabilizer 140, or horizontal stabilizers 150. Panels 130 coupled to aircraft 100 may deflect the released ice and absorb the energy from the impact, thereby protecting aircraft 100. In another example, panels 130 may act as a cladding having non-linear mechanical energy absorption capabilities, which may serve as a shrapnel barrier or a low grade ballistics armor for aircraft 100.

Panels 130 may also protect aircraft 100, and any passengers or cargo, from acoustic disturbance or damage. For example, panels 130 may absorb acoustic energy that is detrimental to aircraft 100 and/or its passengers and cargo. As a specific example, panels 130 may absorb acoustic energy generated by one or more engines of aircraft 100.

FIG. 2 is a cross-sectional view illustrating an example panel 130 that may be coupled to a surface exposed to weather 210, according to certain embodiments. In particular embodiments, panel 130 includes a foam layer 131, a coating layer 132, and an elastomer 133. Foam layer 131 includes a first surface 134, a second surface 135 opposite first surface 134, and a plurality of pores 136 within foam layer 131. Coating layer 132 is deposited on second surface 135 of foam layer 131. Elastomer 133 is deposited within pores 136 of foam layer 131.

Foam layer 131 may comprise any suitable foam material. In particular embodiments, foam layer 131 comprises a metallic foam, a ceramic foam, or a vitreous carbon foam. For example, foam layer 131 may comprise a porous metallic foam made out of certain metals, such as aluminum, copper, or nickel. A metallic foam may comprise one or more metals in order to provide the desired properties of foam layer 131 and panel 130. As an example, foam layer 131 may be a layer of porous aluminum which is approximately 80% air. Not only is the porous aluminum extremely lightweight, the pores within the foam may also provide thermal insulation.

In particular embodiments, foam layer 131 comprises ceramic foam. For example, foam layer 131 is a ceramic foam including aluminum. In another example, the ceramic foam includes titanium oxide. In yet another example, foam layer 131 includes ceramic foam that is a carbide ceramic. In particular embodiments, foam layer 131 comprises a vitreous carbon foam. The vitreous carbon foam may be derived from pyrolyzed polymers.

In general, the foam material in foam layer 131 allows foam panel 130 to absorb mechanical energy, such as energy from an impact from an object. An object impacting panel 130 may cause foam layer 131 to compress, distributing the impact over a large area of panel 130 over a longer period of time. For example, a sheet of ice dislodged from wing 120 of aircraft 100 may impact panel 130 adhered to fuselage 110 of aircraft 100. The impact from the ice sheet compresses foam layer 131, which distributes the force of the impact over a longer period of time by increasing the impact time, and over a larger area of panel 130. In this manner, foam layer 131 of panel 130 may protect portions of aircraft 100, or other surfaces, such as roofs and exterior walls of a building, from damaging impacts through mechanical energy absorption.

Different foam compositions may provide different advantages in certain applications. In certain embodiments, certain metallic foams, such as nickel and aluminum, may have non-linear mechanical energy absorption capabilities. Metallic foams, therefore, not only may reduce damage from ice impacts, but may also serve as shrapnel barriers or low grade ballistics armor. Protection from shrapnel or ballistics provided by metallic foams in panel 130 at a lower weight cost compared to non-porous cladding conventionally used.

In addition, metallic foam may be post-processed to tailor its mechanical properties. For example, the foam's Poisson ratio may be altered during this post processing. In particular embodiments, the metallic foam may comprise a neutral (e.g. approximately 0) or negative Poisson's ratio.

In general, the Poisson's ratio is the signed ratio of transverse strain to axial strain. In other words, Poisson's ratio represents the ratio of a material's expansion in directions perpendicular to an applied compression of the material. Typically, materials exhibit a positive Poisson's ratio. That is, materials expand in directions orthogonal to the compression direction. In some cases, materials may be processed to change their Poisson's ratio. In certain embodiments, a neutral or negative Poisson's ratio may be provided.

Materials having a neutral or negative Poisson's ratio may provide desirable properties for panel 130. For example, the lower the Poisson's ratio, the less expansion in directions perpendicular to the compression direction. Less expansion may improve adhesion between panel 130 to surface exposed to weather 210. The reduced expansion helps foam layer 131 retain its shape despite compression due to impact energy absorption. As another example, the Poisson's ratio may determine a material's mechanical absorption characteristics. Providing a neutral or negative Poisson's ratio may enhance the mechanical absorption characteristics of foam layer 131 enabling more energy absorption or tailoring the absorption characteristics to particular types of impacts. For example, tailored foams having non-linear mechanical energy absorption capabilities may be useful as shrapnel barrier or low grade ballistics armor.

Different processes may be used to provide a material with a neutral or negative Poisson's ratio. As one example, metallic foam may be plastically deformed to change the structure of the metallic foam in order to provide a neutral or negative Poisson's ratio. Persons having ordinary skill in the art would recognize that any suitable method to provide a material with a neutral or negative Poisson's ratio may be employed.

Ceramic and carbon foams may provide advantages different from or in addition to those advantages of metallic foams. Ceramic and carbon foams may be processed in order to provide resistance to high temperatures. For example, certain high temperature elastomers may be applied to the ceramic or carbon foam in order protect the foam from high temperatures. In certain embodiments, the ceramic or carbon foams are resistant to temperatures exceeding 450 degrees Fahrenheit. In this manner, panels 130 may be placed in high temperature regions. As an example, certain portions of aircraft 100 may be subject to high temperatures, particularly near engines and/or exhaust areas. Panels 130 having ceramic or carbon foam processed with high temperature elastomers may be placed in high temperature areas and protect the surfaces from impacts and reduce acoustic energy.

In some embodiments, multiple panels 130 may be coupled to surface exposed to weather 210. Each panel 130 may have different characteristics chosen for the different portions of surface exposed to weather 210 on which each panel 130 is coupled. For example, foam layer 131 of a first panel 130 may be treated with high temperature elastomers, if it is to be coupled to a portion of surface exposed to weather 210 subject to high temperatures (e.g., a portion of exterior surface 160 near an engine of aircraft 100). In other embodiments, foam layer 131 of a second panel 130 may include a metallic foam which has non-linear mechanical energy absorption properties best suited to protect that portion of surface exposed to weather 210. In addition to differences in the types of foam used in foam layer 131, panels 130 may be tailored to particular applications based on elastomer 133 deposited in a plurality of pores in foam layer 131, as described in more detail below.

Foam layer 131 includes a plurality of pores 136 within foam layer 131. The porous nature of foam layer 131 provides several advantages. First, as alluded to above, pores 136 reduce the density, and thus the weight, of foam layer 131 and panel 130. The weight carried by a vehicle may impact fuel consumption and other operating considerations. This may be especially relevant for aircraft, where fuel is costly and refueling is carefully planned to minimize carrying weight.

In some embodiments, pores 136 within foam layer 131 may be filled with other materials, such as elastomer 133. As will be discussed in more detail below, elastomer 133 may enhance certain properties of panel 130, including mechanically reinforcing foam layer 131 and optimizing acoustic energy reduction.

While certain foams used in foam layer 131 exhibit mechanical absorption properties, such properties may be enhanced by introducing one or more elastomers 133 into a portion of pores 136 in foam layer 131. Elastomer 133 deposited within pores 136 may have a certain elasticity which may help foam layer 131 resist impacts and absorb energy more effectively. The types of elastomer 133 deposited within pores 136 of foam panel 131 may differ based on the particular application. For example, a first type of elastomer 133 may be chosen if panel 130 is used on fuselage 110 of aircraft 100, whereas a second type of elastomer 133 may be used if panel 130 is coupled to surface exposed to weather 210 that is subject to high temperatures.

In addition to providing mechanical reinforcement of foam layer 131, elastomer 133 may provide acoustic energy reduction characteristics to panel 130. In some embodiments, elastomer 133 is chosen to reduce the acoustic energy at a particular frequency or band of frequencies. In order to target particular frequencies, one or more of the type elastomer 133, the type of foam used in foam layer 131, the pore density of foam layer 131, and the saturation of elastomer 133 in foam layer 131 may be adjusted or considered. The optimal parameters may be dictated by the targeted application. For example, for panels 130 on fuselage 110 of aircraft 100 near propellers, elastomer 133 may be chosen and deposited such that panel 130 absorbs acoustic energy at low frequencies at a high absorption coefficient.

In particular embodiments, elastomer 133 is a fluorinated elastomer (also described as a fluoroelastomer). Fluorinated elastomer, as used in this disclosure, may refer to any material categorized under the "FKM" fluoroelastomer category according to the American standard ASTM. Fluorinated elastomers may provide certain advantages when applied to foam layer 131 in panels 130. For example, fluorinated elastomers may be more durable than other elastomers and more resistant to environmental conditions and chemicals. Additionally, certain fluorinated elastomers may provide acoustic reduction at particular frequencies. For example, a fluorinated elastomer deposited within foam layer 131 may absorb acoustic energy at lower frequencies, such as energy from sounds from propeller engines, for example.

In particular embodiments, a second elastomer 133 may be deposited within pores 136 within foam layer 131. The combination of a first elastomer 133 with a second elastomer 133 may enhance desired properties, such as mechanical and acoustic energy absorption. The combination of multiple elastomers 133 may require particular deposition procedures and/or curing techniques as understood by those having skill in the art. In some embodiments, more than two elastomers may be deposited within pores 136 of foam panel 131. For example, a third elastomer 133 may be deposited in addition to two other elastomers 133. The relative quantities of the elastomers 133 may be tailored based on one or more of the foam in foam layer 131, the type of exposed surface onto which the panel 130 is coupled, and the environmental conditions of the exposed surface.

In some embodiments, panel 130 includes a coating layer 132 deposited on second surface 135 of foam layer 131. Coating layer 132 may be deposited on second surface 135 of panel 130 that is directly exposed to weather. Exposure to weather may include exposure to rain, ice, snow, noise, wind, sun, or any other environmental conditions. As discussed previously, impacts from ice sheets that are released from portions of aircraft 100 may cause damage to exterior surface 160. Panel 130 may not only be constructed to absorb energy from such impacts, but also prevent them from occurring. For example, coating layer 132 (and optionally foam layer 131) may include materials or chemicals which limit ice adhesion by reducing the surface energy. Surfaces with lower surface energy may result in larger contact angles between the surface and a liquid, such as water. These angles may represent the cohesion between the surface and the liquid, where a higher angle represents a lower cohesion (i.e., less energetically favorable to wet the surface).

In some embodiments, coating layer 132 may include materials which release ice sheets formed on the surface of coating layer 132 before accumulating to a dangerous thickness or size. In particular embodiments, coating layer 132 includes materials which help prevent ice from forming at the surface. In particular embodiments, coating layer 132 is a superhydrophobic fluorinated coating. In some embodiments coating layer 132 may include one or more elastomer coatings at various concentrations to optimize properties of coating layer 132 that limit ice adhesion.

In particular embodiments, coating layer 132 may serve as a rain erosion topcoat. Various aircraft, both military and commercial, require protection from water impacting the surface at speeds of up to 400 knots or more. Water droplets may strip off various coatings on aircraft, requiring maintenance and reapplication. A rain erosion topcoat may be applied in order to protect against the erosion of coatings or materials underneath the rain erosion topcoat. In this manner, coating layer 132 may also serve as a rain erosion topcoat, protecting the other layers of panel 130 and the surface exposed to weather 210.

In particular embodiments, coating layer 132 may be UV tolerant. Ultraviolet radiation may damage certain portions of panel 130 and/or surface exposed to weather 210. For example, many natural and synthetic polymers may degrade when exposed to UV radiation. Degradation in materials in panel 130 may lead to structural failure or diminished mechanical or acoustic energy absorption. For example, UV radiation may degrade elastomer 133 such that impacts from ice sheets cause panel 130 to crack or separate from surface exposed to weather 210. In this manner, coating layer 132 may protect panel 130 and surface exposed to weather 210 from UV radiation.

Coating layer 132 may have one or more of the advantageous properties discussed above. For example, coating layer 132 may include materials which together prevent rain erosion, UV degradation, and limit ice adhesion. In other embodiments, panel 130 may comprise additional coating layers which provide one or more of these properties. For example, a rain erosion topcoat layer may be applied on top of coating layer 132.

Panel 130 may be coupled to surface exposed to weather 210 by coupling first surface 134 of foam layer 131 to surface exposed to weather 210. In particular embodiments, surface exposed to weather 210 is a surface of a vehicle. In some embodiments, the vehicle is aircraft 100, a boat, a rocket, or a space vehicle. For example, surface exposed to weather 210 may be exterior surface 160 of aircraft 100, as depicted in FIG. 1.

In certain embodiments, surface exposed to weather 210 may be an exterior surface of a building. In such embodiments, panel 130 may protect the building by absorbing mechanical impact caused by rain, ice, hail, sleet or debris, and reducing acoustic energy inside the building. For example, multiple panels 130 may be attached to the exterior of a building near factories producing an excess amount of noise that may disrupt activities within the building.

Panel 130 may be coupled to surface exposed to weather 210 by any suitable means. In particular embodiments, panel 130 may be coupled to surface exposed to weather 210 by an epoxy. For example, multiple panels 130 may be coupled to exterior surface 160 of aircraft 100 with an epoxy. The means to couple the panels to the target surface may vary based on a variety of factors, such as the composition of foam layer 130, the type of surface exposed to weather 210, and conditions to which the adhered-to surface is exposed. A person having skill in the art would recognize that there may be a number of ways to couple the panel 130 to surface exposed to weather 160.

FIG. 3 is flow chart diagram illustrating an example method 300 of coupling panel 130 to surface exposed to weather 210, according to certain embodiments.

Method 300 may begin at step 310 where an elastomer such as elastomer 133 is deposited within a plurality of pores of a foam panel such as foam panel 131 or any suitable foam structure. The deposited elastomer may mechanically reinforce the foam panel and provide acoustic energy absorption. Additionally, the deposited elastomer may enhance the hydrophobic properties of the foam panel. As disclosed above, elastomer 133 may be chosen based on the target application of panel 130 based on a variety of factors.

At step 320, a surface such as second surface 135 of foam panel 131 is coated with a coating layer such as coating layer 132 after the elastomer is deposited within the foam panel in step 310. As described above, coating layer 132 may provide certain protections to foam layer 131. For example, coating layer 132 may be UV tolerant, serve as a rain erosion topcoat, and/or provide a hydrophobic surface for foam panel 131. In particular embodiments, coating layer 132 is a superhydrophobic fluorinated coating.

At step 330, the foam panel of step 320 is coupled to a surface exposed to weather (e.g., exterior surface 160 of aircraft 100 or surface exposed to weather 210). The foam panel, which includes the coating layer of step 310 and the deposited elastomer of step 310, may be coupled to the surface in any suitable manner. The technique used to couple the foam panel may depend on one or more of the type of foam in the foam panel, the type of the surface exposed to weather, and the environmental conditions of the surface exposed to weather. In particular embodiments, an epoxy may be used to couple the foam panel to the surface exposed to weather. A certain epoxy may be chosen to ensure that the foam panel remains coupled to the surface despite surface impacts and the compression of the foam panel. After step 330, method 300 may end.

Modifications, additions, or omissions may be made to method 300 depicted in FIG. 3. Method 300 may include more, fewer, or other steps. For example, in an optional step 315, the foam panel may be processed to provide the foam panel with a neutral or negative Poisson's ratio. Having a neutral or negative Poisson's ratio may have certain advantages, as described above. Furthermore, steps may be performed in parallel or in any suitable order. While various components of panel 130 were discussed in relation to the steps in method 300, the steps of method 300 may be taken using any suitable component or combination of components of panel 130.

FIG. 4 is an example absorption plot 400 that may be used to determine characteristics of one or more elements in a structural panel such as panel 130. As illustrated in FIG. 4, absorption plot 400 plots the absorption coefficient as a function of the frequency of acoustic energy. In other words, absorption plot 400 illustrates the amount or portion of the acoustic energy absorbed at each frequency. Absorption plot 400 includes a target peak frequency 405, a target absorption coefficient 410, and a target frequency width 415.

In general, absorption plot 400 may also represent a target acoustic profile of an environment. For example, absorption plot 400 may be based on the acoustic environment of a particular area, surface, or space. In some embodiments, absorption plot 400 may be based on measurements of the acoustic energy at various frequencies at surface exposed to weather 210, such as exterior surface 160 of aircraft 100 during operation. As an example, absorption plot 400 may be generated using measurements of the acoustic energy across a frequency at surface exposed to weather 210. Using the acoustic energy intensity values across the measured frequency range, absorption coefficient values may be determined for each measured frequency. For example, a higher absorption coefficient value may be associated with a higher measured intensity at that frequency. Other factors, such as human sensitivity or the type of surface exposed to weather, may affect the generation of absorption plot 400 based on measured acoustic energy intensities. For example, frequencies outside the normal human hearing range may not be considered, or may be associated with a lower or null absorption coefficient value. In this manner, absorption plot 400 may represent a target acoustic profile, which may be used to provide materials or components to produce a structural panel, such as panel 130, that has similar acoustic energy absorption characteristics as the target acoustic profile.

As illustrated in FIG. 4, absorption plot 400 plots a continuous curve over the range of frequencies shown. In some embodiments, absorption plot 400 is a discontinuous plot or a set of discontinuous points extrapolated to provide a continuous plot. In some embodiments, absorption plot 400 is only plotted within a particular frequency range or within a particular absorption coefficient range. In some embodiments, absorption plot 400 is not a single curve, but a set of curves over the frequency range. For example, there may be a range of absorption coefficients for each frequency such that absorption plot 400 plots out an area bounded by a bottom curve and a top curve across the frequency values.

In certain embodiments, absorption plot 400 may represent the absorption characteristics of a material or composite. For example, a plot may be generated by measuring the absorption by a material of acoustic energy at various frequencies. The absorption plot generated by measuring the absorption characteristics of a material may be compared to a target acoustic profile. In this manner, absorption plot 400 may be used to confirm that chosen characteristics provide the correct or adequate absorption characteristics desired. Thus, absorption plot 400 may not only be use as a target acoustic profile, but also as a tool to compare the characteristics of a produced material to a target acoustic profile.

Target peak frequency 405 is a frequency at which the absorption coefficient is maximized. For example, absorption plot 400 shows a single target peak frequency 405 where the corresponding absorption coefficient is largest across the frequencies on plot 400. In some embodiments, absorption plot 400 may have multiple target peak frequencies 405 and the absorption coefficients at those target peak frequencies 405 may be only local maximums, e.g. one peak may be larger than the other, but each locally maximizes the absorption coefficient. For example, a twin peak absorption plot of the absorption coefficients for a certain material may have a low frequency peak and a high frequency peak.

Target absorption coefficient 410 is a value for the coefficient of absorption at a particular frequency. In general, the coefficient of absorption is a measurement of how much acoustic energy is absorbed at a particular frequency. In certain embodiments, a particular value for target absorption coefficient 410 is chosen for target peak frequency 405. For example, it may be desirable for a material or composite to have an absorption coefficient above 0.90 at a particular target peak frequency 405. In this manner, a material may be chosen which has a coefficient of absorption at least as large as target absorption coefficient 410 at target peak frequency 405. the chosen material absorbs most of the acoustic energy at the particular frequency.

Target frequency width 415 is a width between the highest frequency and lowest frequency having an absorption coefficient above a particular value. For example, target frequency width 415 on absorption plot 400 is the frequency width at an absorption coefficient labeled a1. In certain embodiments, a material is chosen having a frequency width at least as large as target frequency width 415 around target peak frequency 405. For example, if target peak frequency 405 has a value of 400 Hz, it may be desirable to have a material with a frequency width at least as large as target frequency width 415 of 100 Hz. The frequency range around target peak frequency 405 may be symmetric, or alternatively, asymmetric. Since target frequency width 415 is dependent on a threshold absorption coefficient value, a threshold value and target frequency width 415 may be utilized when determining the appropriate material(s). Using the example above, if an absorption coefficient of 0.90 at target particular peak frequency 405 is chosen, a 100 Hz target frequency width 415 at absorption coefficient value of 0.85 may also be chosen. As a result, a material or composite matching the target acoustic profile characteristics will have an absorption coefficient above 0.85 within that 100 Hz band and an absorption coefficient of at least 0.90 at the specified peak frequency.

FIG. 4 merely serves as an illustration to provide context for aspects in this disclosure. Each surface exposed to weather or material may have a different corresponding absorption plot. For example, the absorption plot corresponding to a particular surface or material may have different peak frequencies, including having more than one peak frequency, and have a different shape, including different frequency widths at various absorption coefficient values. Because of the variability of the absorption plots, a particular material or composite of materials may be chosen to target absorption of different acoustic energy profiles. Moreover, a particular material or composite may be tailored in order to best absorb acoustic energy at certain levels at targeted frequency ranges.

FIG. 5 is a flow chart diagram illustrating an example method 500 of providing a panel with selective acoustic energy absorption characteristics, according to certain embodiments. Method 500 begins in step 502, where a target acoustic profile is determined. The target acoustic profile may include a set of frequencies, frequency bands, and associated absorption levels at those frequencies. For example, the target acoustic profile may correspond to the acoustic environment, e.g. the levels of acoustic energy across a range of frequencies, at or near a surface exposed to weather. As a specific example, the target acoustic profile may be an absorption plot, such as absorption plot 400, generated based on the acoustic energy profile of exterior surface 160 of aircraft 100 near fuselage 110.

In particular embodiments, the exterior surface exposed to weather is an exterior surface of a vehicle, such as exterior surface 160 of aircraft 100. Vehicles are often exposed to high intensities of acoustic energy near their exterior surfaces due to the turbulence of the fluid surrounding the vehicles. High speed vehicles are especially susceptible to this phenomenon due to their high rate of speed through a fluid, e.g. air or water. The acoustic profile may be based on the acoustic conditions of the vehicle during operation. As a particular example, the target acoustic profile may correspond to the acoustic energy profile near a surface of an aircraft during operation. In certain embodiments, the vehicle is one of a boat, an aircraft, an automobile, and a rocket. Each vehicle may be subject to different acoustic conditions. The acoustic profile may be individually tailored to a particular vehicle or a type or class of vehicle. For example, a rocket and an automobile are subject to very different acoustic conditions during their operation, but each may benefit from the reduction of that acoustic energy.

In particular embodiments, the acoustic profile is based on human sensitivity to acoustic energy near the surface exposed to weather. The acoustic profile may be determined in step 502 by focusing on frequencies affecting humans. For example, certain frequencies of acoustic energy above or below range of frequencies heard by humans, or otherwise do not affect humans adversely may be neglected or removed from consideration when the acoustic profile is determined in step 502. In certain embodiments, the acoustic profile is based on additional considerations, including resonance frequencies of the surface exposed to weather and vibrational sensitivities of objects, structures, or persons near the surface exposed to weather.

In particular embodiments, the acoustic profile includes target peak frequency 405, target absorption coefficient 410, and target frequency width 415. For example, acoustic energy with high intensity at a particular frequency may be determined to be target peak frequency 405 of the acoustic profile to maximize the absorbed acoustic energy. Since it may be desirable to absorb acoustic energy across a range of frequencies, a frequency centered around the frequencies with the highest intensity levels may be selected as target peak frequency 405. In some embodiments, target peak frequency 405 may be shifted away from the frequency with the highest intensity level to account for human sensitivity or other considerations. As another example, target peak frequency 405 may be determined in order provide the most overall absorption of acoustic energy. In this manner, even if a material does not have a peak absorption coefficient matching target peak frequency 405, it may still absorb the most acoustic energy at or near the target environment, e.g. surface exposed to weather 210.

In some embodiments, target absorption coefficient 410 of the acoustic profile may be determined for one or more frequencies. As an example, target absorption coefficient 410 may be selected as a threshold for the absorption coefficient at one or more of target peak frequency 405 and the range of frequencies within the target frequency width 415 around target peak frequency 405. Target frequency width 415 may be determined at a particular absorption coefficient to provide a minimum absorption coefficient across that range of frequencies. In this manner, the acoustic profile may include several characteristics which may be used to create target absorption plot or a range of target absorption plots, such as absorption plot 400. The target acoustic profile may be used in further steps in order to provide optimal absorption of acoustic energy matching the target acoustic profile at an exterior surface exposed to weather.

Using the determined target acoustic profile, a plurality of foam layer characteristics are determined in step 504. The foam layer characteristics may be determined to aid in selecting an optimal foam layer to absorb acoustic energy based on the acoustic profile of step 502. In certain embodiments, the plurality of foam layer characteristics includes a foam layer material, a foam layer pore density, and a foam layer thickness. Different foam layer materials may absorb acoustic energy at different absorption coefficients across a range of frequencies. Furthermore, different foam layer materials may allow different elastomers to be deposited within the pores of the foam layer. For example, certain high temperature elastomers may only be applied to materials that may survive high temperature environments. In certain embodiments, the foam layer material is one of a metallic foam, a ceramic foam, or a vitreous carbon foam. As discussed previously, different types of foam materials may have different properties and applications. This applies equally to their acoustic properties. Thus, depending on the acoustic profile, different foam layer materials may be used.

The foam layer pore density is the density of pores within the foam layer. Generally, the greater the pore density, the greater the acoustic absorption. High pore densities, however, may reduce the resilience of the foam layer against impacts or other damaging events. Thus, the pore density may be chosen in light of mechanic properties in addition to the acoustic properties. In particular embodiments, the pore density is chosen from a predetermined set of values. For example, the pore density may be selected from the set of 5, 10, 20, or 40 pores per inch.

The foam layer thickness may also affect the foam layer's acoustic properties. For example, a thicker foam layer may absorb more acoustic energy, but may be susceptible to greater wear and tear due to operating conditions. For example, a thicker foam layer may present a larger profile across which air or another fluid has to flow. Additionally, a thicker foam layer may be harder to attach or maintain attached to the target exterior surface. Thus, the foam layer thickness may be determined based on the acoustic profile and in certain embodiments, also based on other functional considerations.

The various foam layer characteristics may be interdependent. In other words, optimizing one characteristic based on the acoustic profile may reduce the overall effectiveness of the foam layer in absorbing the acoustic energy according to the acoustic profile. In certain embodiments, the determination of the plurality of foam layer characteristics takes in to account the various interdependencies in order to best choose the various characteristics for the foam layer.

Using the determined target acoustic profile and the determined foam layer characteristics, one or more elastomer characteristics are determined in step 506. Different types of elastomers may change the acoustic properties of the foam layer to better match different acoustic profiles. Furthermore, different saturation levels of the elastomer in the foam layer may change the acoustic properties in different ways. For example, different elastomer types and saturation levels may shift the peak absorption frequency or change the frequency width of the absorption coefficient above a threshold level.

In particular embodiments, the one or more elastomer characteristics include an elastomer composition and an elastomer saturation level. The elastomer composition could be the designation of one or more types of elastomers to be deposited in the foam layer. In certain embodiments, the elastomer composition includes an elastomer that is a fluoroelastomer. As discussed earlier, fluoroelastomers may be advantageous for a variety of reasons. Fluoroelastomers may also be useful in enhancing the foam layer absorption of acoustic energy.

The elastomer saturation represents the saturation level of the elastomer inside the provided foam layer. For example, the elastomer saturation may be a percentage of the space inside the foam layer filled with the elastomer. As another example, the elastomer saturation may be a weight or volume of the elastomer relative to the provided foam layer.

In particular embodiments, the determined elastomer composition includes more than one elastomer. For example, step 506 may include substeps of choosing first and second elastomers based on the target acoustic profile and the determined foam layer characteristic and then determining a ratio between the two elastomers based on the target acoustic profile, the determined foam layer characteristics, and characteristics of the two elastomers. In this manner, the acoustic energy reduction properties may be optimized by mixing two or more types of elastomers.

In certain embodiments, during one or more of steps 504 and 506, desired mechanical absorption properties may also be considered when determining the foam layer and elastomer characteristics. If the foam layer is intended to be used on a surface subject to impact events, the foam layer and the elastomer characteristics may be selected to enable the panel created using the foam layer and elastomer to withstand impacts in addition to absorbing acoustic energy. For example, certain characteristics may be desirable to optimize acoustic energy absorption, but may be detrimental or suboptimal if the intended use also requires mechanical energy absorption. In this manner, the determination of the characteristics for acoustic energy absorption may be constrained by the additional consideration of mechanical energy absorption.

In step 508, a foam layer is provided with the determined foam layer characteristics. For example, the determined foam layer characteristics may be used to choose a foam layer material with a certain pore density and layer thickness. Additional steps may be taken to process a foam before providing the foam layer with the determined foam layer characteristics. For example, the foam layer may be shaped to a desired thickness or size, or the foam may be processed to provide it with certain mechanical properties, such as a certain Poisson's ratio. In certain embodiments, the foam layer may be chosen from a predetermined set of foam materials, pore densities, and thickness based on the determined foam layer characteristics. A preconfigured foam layer may be processed to more closely align it with the determined characteristics.

In step 510, the elastomer is deposited according to the determined elastomer characteristics. As a result, a foam layer, chosen using determined foam layer characteristics, with deposited elastomer, chosen using determined elastomer characteristics, may be provided. In this manner, the foam layer with deposited elastomer may be optimized to absorb acoustic energy corresponding to the acoustic profile.

In certain embodiments where the elastomer includes more than one elastomer type or a mixture of different elastomers, step 510 may include substeps of depositing each elastomer into the foam layer. In other embodiments, the elastomer is deposited in a single process after two or more elastomers are mixed.

In step 512, the foam layer with the deposited elastomer is coupled to an exterior surface exposed to weather. The foam layer may be coupled to the exterior surface using any suitable techniques. The type of surface or the chosen foam layer may determine how the foam layer with the deposited elastomer is coupled to the surface. In certain embodiments, an epoxy is used to couple the foam layer to the surface.

By coupling the foam layer to the exterior surface, the foam layer with the deposited elastomer may absorb acoustic energy corresponding to the target acoustic profile. Because the target acoustic profile may be based on the acoustic environment near the exterior surface exposed to weather, the foam layer with the deposited elastomer may absorb a large portion of the acoustic energy near the exterior surface. In this manner, acoustic energy absorption may be selectively provided based on the acoustic conditions of the target surface exposed to weather.

Different exterior surfaces may have different acoustic conditions and certain embodiments described herein allow for the tailoring of foam layers with deposited elastomer to target acoustic absorption to those conditions. As an example, an aircraft may have a particular acoustic environment during operation, e.g. during flight or takeoff. By using an acoustic profile based on the specific conditions, the provided foam layer and deposited elastomer may optimally absorb that acoustic energy when coupled to an exterior surface of the aircraft. Continuing with this example, certain embodiments may protect passengers from harmful noise and acoustic energy, as well as protect vibrationally sensitive equipment and reduce dangerous resonance on or near the aircraft.

As an example, method 500 may provide a foam layer for the exterior surface of an aircraft. In this example, the target acoustic profile may be based on the intensity of acoustic energy around the exterior of the aircraft. For example, the exterior surface of a propeller plane may be subject to acoustic energy caused by the propellers in the range from 150 to 400 Hz. Alternatively, for jet planes, the acoustic energy may most intense in the range from 600 Hz to 1.25 kHz.

Continuing with this example, the human sensitivity to particular frequency ranges may be considered. For example, a peak frequency of 2 kHz may be chosen for the target acoustic profile taking into account the acoustic energy acoustic energy at the surface and the human sensitivity to specific frequencies. In this example, a target absorption coefficient of 0.99 may be chosen for the peak frequency of 2 kHz and a target frequency width of 1360 Hz may be chosen to capture the range of 1480 Hz to 2840 kHz. Using these chosen values, the foam layer characteristics may be determined. In this example, based on the target acoustic profile, an aluminum foam with 0.5 inch thickness and pore density of 20 pores per inch may be chosen. Then, based on the acoustic profile and the chosen foam layer, an elastomer may be chosen. In this example, a Type 1 FKM fluoroelastomer may be chosen to shift the frequency attenuation curve of the chosen foam layer to lower frequencies. For example, the elastomer may be chosen to only partial fill the foam layer to approximately 50% in order to shift the absorption attenuation curve such that the attenuation rate is greater than 0.99 between 400 Hz to 2 kHz. The chosen foam layer with the deposited elastomer chosen may be coupled to the exterior of the aircraft in order to provide selective acoustic reduction.

In a variant of the example provided above, the exterior surface of the aircraft may be a high-temperature area, for example near Auxiliary Power Unites (APU's). In this case, the high temperature atmosphere may be taken into account. As a result, instead of an aluminum foam, a ceramic or carbon foam may be chosen to withstand the exhaust temperatures of up to 1100 degrees Fahrenheit. Additionally, in this example, a different fluoroelastomer may be chosen. For example, an FKM type 2 elastomer may be chosen instead. These examples are provided merely as instructional examples and a myriad of other embodiments are contemplated within this disclosure.

In certain embodiments, method 500 may further include steps of determining whether to provide an additional foam layer based on the target acoustic profile and coupling the additional foam layer to the foam layer with the deposited elastomer. Adding an additional foam layer may change the acoustic absorption characteristics of the foam layer with the deposited elastomer. As an example, an additional foam layer may broaden the absorption peaks of the foam layer with elastomer such that a broader range of frequencies are absorbed with a high absorption coefficient. Additionally, the additional foam layer may change the peak frequency absorbed by the foam panel and elastomer.

Furthermore, the foam layer and elastomer may protect the additional foam layer from degradation or wear and tear. For example, the foam layer and elastomer may absorb the impacts from objects, e.g. sheets of ice, which protects the additional foam layer, increasing its operational life. In particular embodiments, the additional foam layer may be composed of softer or more fragile materials. In certain embodiments, the additional foam layer is a layer of melamine foam. Melamine foam has well-known acoustic absorption properties, but degrades quickly, particularly in disruptive environments, such as the exterior of an aircraft during flight. By adding the melamine foam to the foam layer with deposited elastomer, the acoustic absorption properties may be enhanced to provide acoustic absorption properties to better match the acoustic profile. At the same time, the melamine foam is protected by the foam layer and elastomer so that it may continue to enhance the acoustic energy absorption throughout the lifetime of the foam layer.

In certain embodiments, method 500 further includes coating the foam layer with a superhydrophobic fluorinated coating layer. As discussed previously, the coating layer may serve as an rain erosion topcoat layer which is UV tolerant. In this manner, the coating layer may help protect the foam layer from rain erosion and deterioration from exposure to UV radiation.

In certain embodiments, method 500 further includes decoupling a foam layer from the exterior surface exposed to weather and coupling another foam layer with deposited elastomer onto the exterior surface exposed to weather. In some embodiments, new techniques or materials may be found that may be used to create superior foam layers. In this manner, outdated foam layers may be replaced. Thus, in certain embodiments, an old foam layer may be removed and replaced with a new one.

Modifications, additions, or omissions may be made to method 500 depicted in FIG. 5. The steps of method 500 may be performed in parallel or in any suitable order. Furthermore, method 500 may include more, fewer, or other steps. The steps of method 500 may be taken using any suitable component or combination of components, including components of panel 130 and/or aircraft 100.

The present disclosure may provide numerous advantages. For example, the foam layer combined with the elastomer may be sufficiently strong and elastic to absorb impacts from objects, thereby protecting the surface on which the apparatus is coupled. Absorption of mechanical energy may be tailored based on the materials used in the foam panel and/or the elastomer deposited within the foam panel. As another example, the foam panel may comprise a metallic foam having a neutral or negative Poisson's ratio. Having a neutral or negative Poisson's ratio may enhance adhesion of the foam panel and certain absorption properties. Another advantage of the present disclosure is that the coating layer in combination with the foam layer may be hydrophobic. The hydrophobic nature of the apparatus may prevent the buildup of ice on the surface of the apparatus and thereby, the surface exposed to weather. As another advantage, the apparatus may exhibit nonlinear mechanical absorption capabilities, which may serve as a shrapnel barrier or low-grade ballistics armor. Certain other advantages may be realized with the use of fluorinated elastomer material deposited within the foam layer. For example, fluorinated elastomers may be more resistant to degradation and other environmental forces.

Other aspects disclosed herein provide other advantages. For example, using a target acoustic profile, a foam layer with deposited elastomer may be tailored to absorb acoustic energy based on that acoustic profile. Selective acoustic energy absorption may enhance the safety and comfort of passengers in vehicles, such as an aircraft. As another example, certain foam layer and elastomer characteristics may be determined based on the acoustic profile. By choosing the set of characteristics that provide the panel with acoustic absorption most closely matching the acoustic profile, the foam layer with deposited elastomer may be optimized for particular exterior surfaces and conditions. As yet another example, an additional foam layer may be added to the foam layer with deposited elastomer to improve the absorption characteristics in the created panel. The additional foam layer may be disposed between the exterior surface and the first foam layer, protecting the additional foam layer from environmental conditions.

Other technical advantages will be readily apparent to one skilled in the art from the following figures, descriptions, and claims. Moreover, while specific advantages have been enumerated above, various embodiments may include all, some, or none of the enumerated advantages.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An aircraft, comprising:
   an exterior surface; and
   a plurality of panels coupled to the exterior surface of the aircraft, each panel comprising:
      a metallic foam layer comprising:
         a first surface for coupling the panel to the exterior surface of the aircraft;
         a second surface opposite the first surface; and
         a plurality of pores within the metallic foam layer;
      a superhydrophobic fluorinated coating layer deposited on the second surface of the metallic foam layer; and
      an elastomer deposited within the plurality of pores within the metallic foam layer.

2. The aircraft of claim 1, wherein the exterior surface of the aircraft is a portion of at least one of a fuselage, a wing, a vertical stabilizer, or a horizontal stabilizer of the aircraft.

3. The aircraft of claim 1, wherein the metallic foam layer comprises a neutral or negative Poisson's ratio.

4. The aircraft of claim 1, wherein each panel of the plurality of panels further comprises a second elastomer deposited within the plurality of pores within the metallic foam layer.

5. The aircraft of claim 1, wherein the plurality of panels are coupled to the exterior surface of the aircraft with an epoxy.

6. The aircraft of claim 1, wherein the elastomer comprises fluorinated elastomer material.

7. An apparatus, comprising:
a foam layer comprising:
a first surface for coupling the apparatus to a surface exposed to weather;
a second surface opposite the first surface; and
a plurality of pores within the foam layer;
a coating layer deposited on the second surface of the foam layer; and
an elastomer deposited within the plurality of pores within the foam layer.

8. The apparatus of claim 7, wherein the foam layer comprises a metallic foam, a ceramic foam, or a vitreous carbon foam.

9. The apparatus of claim 7, wherein the surface exposed to weather is an exterior surface of a building.

10. The apparatus of claim 7, wherein the surface exposed to weather is a surface of a vehicle.

11. The apparatus of claim 10, wherein the vehicle is an aircraft, a boat, a rocket, or a space vehicle.

12. The apparatus of claim 7, wherein the coating layer is a superhydrophobic fluorinated coating.

13. The apparatus of claim 7, wherein:
the foam layer comprises a ceramic foam or a vitreous carbon foam; and
the deposited elastomer is a heat-resistant elastomer capable of resisting temperatures above 450 degrees Fahrenheit.

14. The apparatus of claim 7, wherein the foam layer comprises a metallic foam comprising a neutral or negative Poisson's ratio.

15. The apparatus of claim 7, wherein the elastomer comprises fluorinated elastomer material.

16. A method comprising:
depositing an elastomer within a plurality of pores of a foam panel, the foam panel comprising:
a first surface for coupling the foam panel to a surface exposed to weather;
a second surface opposite the first surface; and
a plurality of pores within the foam layer;
coating the second surface of the foam panel with a coating layer; and
coupling the foam panel to the surface exposed to weather.

17. The method of claim 16, further comprising processing the foam panel to provide the foam panel with a neutral or negative Poisson's ratio.

18. The method of claim 16, wherein the provided foam layer foam comprises a metallic foam, a ceramic foam, or a vitreous carbon foam.

19. The method of claim 16, wherein the coating layer is a superhydrophobic fluorinated coating.

20. The method of claim 16, wherein:
the surface exposed to weather is a surface of a vehicle; and
the vehicle is an aircraft, boat, rocket, or space vehicle.

* * * * *